US006767425B2

(12) United States Patent
Meier

(10) Patent No.: US 6,767,425 B2
(45) Date of Patent: Jul. 27, 2004

(54) METHOD FOR PRODUCING A STRIP-SHAPED OBJECT

(75) Inventor: Johannes Meier, Basadingen (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 10/415,115

(22) PCT Filed: Oct. 13, 2001

(86) PCT No.: PCT/EP01/11862

§ 371 (c)(1),
(2), (4) Date: Apr. 24, 2003

(87) PCT Pub. No.: WO02/34505

PCT Pub. Date: May 2, 2002

(65) Prior Publication Data

US 2004/0099370 A1 May 27, 2004

(30) Foreign Application Priority Data

Oct. 24, 2000 (EP) ........................................... 00810983

(51) Int. Cl.$^{7}$ ................................................ B32B 31/00

(52) U.S. Cl. ....................... 156/259; 156/260; 156/271; 156/292; 156/291; 156/270; 156/512; 156/517; 156/559; 156/516; 156/197

(58) Field of Search ................................. 156/259, 260, 156/271, 270, 291, 292, 512, 517, 559, 516, 197

(56) References Cited

U.S. PATENT DOCUMENTS 3,655,475 A * 4/1972 Stelling, Jr. et al. ........ 156/197

* cited by examiner

*Primary Examiner*—Linda L. Gray
(74) *Attorney, Agent, or Firm*—Bachman & LaPointe, P.C.

(57) ABSTRACT

A method for producing a strip-shaped object of any thickness, width and length, made up of stacked, partially glued together foil strips. According to said method, each of the foil strips is provided with adhesive strips applied across the width (u) of the foil strip on one side, and the adhesive strips are offset from each other on foil strips that directly follow each other. The foil strips are stacked to produce a foil strip stack, pressed against each other in the stacking direction and glued together in order to produce the strip-shaped object. In the process, a line of foil which is provided with adhesive strips crosswise to its longitudinal direction (x) is divided into at least two lines of foil strips of equal width in its longitudinal direction (u). The individual lines of foil strips are deviated and guided one above the other with adhesive strips which are offset from each other, cut into sections from foil strip packets consisting of individual foil strips, in cycles, and fed to the foil strip stack in the form of foil strip packets.

15 Claims, 2 Drawing Sheets

METHOD FOR PRODUCING A STRIP-SHAPED OBJECT

BACKGROUND OF THE INVENTION

The invention relates to a process for the manufacture of a tape-shaped object of any desired thickness, width and length, formed from stacked and partially glued together film strips, in which one side of each film strip is provided over its entire width with adhesive strips, and the adhesive strips of directly consecutive film strips are arranged to be offset, where the film strips are stacked into a film strip stack, pressed against one another in the direction of stacking and glued together to form the tape-shaped object. A suitable device to complete the process is also part of the invention.

Two processes for manufacture of a tape-shaped object from partially glued together film strips are in essence currently known. The first process relates to the manufacture of blocks of film sheets laid on top of one another and provided with adhesive strips, with subsequent gluing of the individual sheets to one another under the effect of pressure and heat, where the blocks manufactured in this way are sawn into slices, the cut width of which corresponds to the subsequent thickness of the tape-shaped object. Gluing the individual slices together produces a virtually endless object. This method of manufacture is for example disclosed in DE-A-2342076 and is currently used in practice.

The disadvantage of this previously known manufacture by way of production of a block, with blocks being subsequently sawn up into individual slices, lies principally in the fact that during commercial manufacture the blocks are so thick that the transmission of heat into the block in order to trigger the adhesive process requires long heating and compression times and in addition can lead to an uneven temperature distribution with corresponding reduction in the quality of the end product. The subsequent cutting of a block into slices using a band saw leads to a considerable degree of waste. Moreover, four individual processing stages are necessary in order to manufacture the tape-shaped object formed from partially glued together film strips, namely 1. Stacking the sheets provided with adhesive strips
2. Compressing the stacked sheets into a block
3. Sawing the block into individual slices and
4. Gluing the individual slices into the quasi endless object.

In addition, gluing the individual slices produces points in the object which have a negative effect on the characteristics of the object, and which may therefore in some circumstances even have to be removed.

The second type of manufacture is based on film strips provided with adhesive strips, which are stacked on top of one another and are compressed into an endless tape-shaped object in the direction of stacking and with the addition of heat. Such a process is known for example from DE-C-3820718, in which a film web is provided continuously with longitudinal adhesive strips. The individual film strips are cut across the direction of movement of the film web on the line, are stacked on top of one another to form a film strip stack, and are compressed under pressure in the direction of stacking and with the addition of heat into an endless tape-shaped object.

The main disadvantage of this process involves primarily the low production speed, which cannot be significantly increased even when two film webs are simultaneously brought together for cutting of the individual film strips for the purposes of commercial manufacture of an endless tape-shaped object. Despite the advantages over traditional block manufacture, as regards improved heat application for gluing the film strip stack and the considerably reduced sawing waste when cutting the individual film strips, it has not so far been possible to implement the processes based on this principle in practice.

SUMMARY OF THE INVENTION

The invention seeks to solve the problem of creating a process of the type described at the outset, by way of which a tape-shaped object of high quality formed form partially glued together film strips can be commercially manufactured on a production line. A further aim is the creation of a suitable device to effect the process.

BRIEF DESCRIPTION OF THE DRAWINGS

Further benefits, features and details relating to the invention are evident from the description below of preferred forms of embodiment, and on the basis of the drawings, which diagrammatically represent the following.

DETAILED DESCRIPTION

Figure 1:
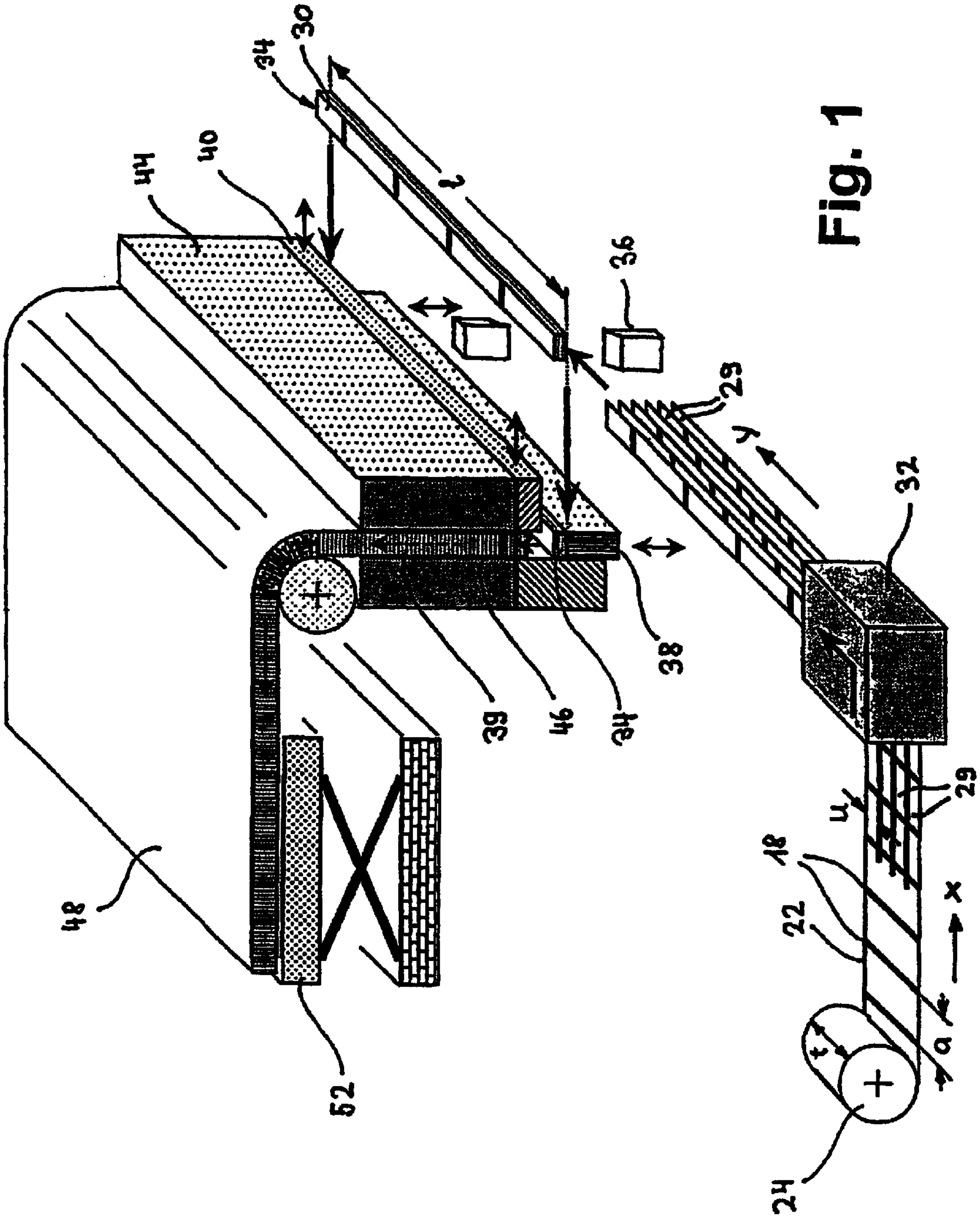
FIG. 1 a view from the side of an arrangement for the manufacture of an endless tape-shaped object made of partially glued together film strips.

With respect to the process, the fact that a film web provided across its longitudinal direction with adhesive strips is divided in its longitudinal direction into at least two film strip webs of equal width and the individual film strip webs are turned and brought on top of one another with adhesive strips offset from one another, are regularly cut into lengths as film strip packs comprising individual film strips and taken to the film strip stack as film strip packs, leads to the solution of the problem according to the invention.

A preferred sphere of application of the process is in the manufacture of tape-shaped objects, in which the adhesive strips on the individual film strips are equidistant from one another and are arranged offset by half such a distance on film strips immediately following one another.

A preferred material for the films comprises aluminium or an aluminium alloy. Depending on the intended use of the tape-shaped object, however, other materials may be used as film material, for example paper, plastics, other metal films or even laminates made of the above materials.

In order to increase the pressure acting in the stacking direction on the film strips within the film strip stack, a friction effect may be generated by pressure from the sides on the film strip stack. A further or additional alternative involves inhibiting or braking the forwards movement of the film strip stack.

During the adhesive operation, the film strips in the film strip stack may be heated and/or cooled.

Division of the film web into the individual film strip webs is preferably undertaken by waste-free cutting.

Instead of using a prefabricated film web, this may also be pretreated and provided with the adhesive strips on the line.

A device suitable to complete the process is characterised by a first cutting station to divide in its longitudinal direction a film web provided across its longitudinal direction with adhesive strips, into at least two film strip webs of equal width, a turning station to turn and bring on top of one another the individual film strips with adhesive strips offset from one another, a second cutting station for the regular cutting into lengths of the film strips brought on top of one another, as film strip packs comprising individual film strips, handling elements for further transport of the film strip packs, a pull-out element on which to lay the individual film strip packs, and a gluing unit with a gap to take the film strip packs by way of the pull-out element, where the gluing unit is designed in such a way that pressure can be exerted on the film strip stack in the gap. The tape-shaped object can be manufactured as an endless tape using the device described.

The gluing unit may be designed in such a way that in order to increase the pressure acting on the film strips in the film strip stack in the direction of stacking, a friction effect is produced by way of pressure from the sides on the film strip stack. Another alternative involves arranging braking units after the gluing unit in order to inhibit the forwards movement of the film strip stack.

The gluing unit may be designed to be heatable and/or coolable.

A second device suitable to effect the process is particularly suitable for the manufacture of individual tapes or tape sections with prescribed dimensions. The device is characterised by a first cutting station to divide in its longitudinal direction a film web provided across its longitudinal direction with adhesive strips, into at least two film strip webs of equal width, a turning station to turn and bring on top of one another the individual film strip webs with adhesive strips offset from one another, a second cutting station for the regular cutting into lengths of the film strip webs brought on top of one another, as film strip packs comprising individual film strips, handling elements for the further transport of the film strip packs, a pull-out element on which to lay the individual film strip packs, a stacking module with a gap to take the film strip packs by way of the pull-out element, and two limiting elements which may be inserted from both sides into the gap in the stacking module, to generate pressure on the film strip stack in the gap.

The first cutting station preferably includes a cutting device for waste-free cutting, to divide the film web into the individual film strip webs. In this way the film web can be divided into film strip webs of any desired and precise width.

The turning station to turn and bring on top of one another the individual film strip webs preferably includes rollers arranged at an angle of 45° to the film web.

The second cutting station expediently includes a revolving blade.

In an arrangement shown in FIG. 1 for the manufacture of an endless tape-shaped object 48 made of partially glued together film strips, a film web 22, of width t, provided with adhesive strips 18 arranged at equal distance a from one another, is wound off a film strip web 24 and is divided into film strip webs 29 of equal width in a cutting station not shown in the drawing, for example using a revolving cutter, in the direction of movement x of film strip 24. An important feature is the fact that the cutting is waste-free. A blade, laser beam or water jet or other suitable cutting device may also be used in place of a revolving cutter.

Instead of using a prefabricated film web, this may also be pretreated and provided with the adhesive strips 18 directly on the line.

The individual film strip webs 29 are subsequently turned and positioned on top of one another in a turning station 32, in such a way that the film strip webs 29 immediately adjacent to the adhesive strips 18 are arranged offset from one another by half the distance a between the adhesive strips. The turning operation may for example take place over rollers, which are arranged at an angle of 45° to the film web.

The film strip webs 29 with offset adhesive strips 18 which exit the turning station 32 are laid in a second transport direction y onto a pull-out element 38, after being cut into lengths using a cutting blade 36 running alongside, to the desired length 1, as film strip packs 34 comprised of individual filmstrips 30. The pull-out element 38 with the film strip pack 34 lying on it subsequently moves into a gap 46 of a gluing unit 44 which may if necessary be heatable and/or coolable and pushes the film strip pack 34 against the film strip stack 39 already located in the gap 46. The gap 46 in the gluing unit 44, which is arranged vertically in this form of embodiment, may be closed by a retaining element 40 which may be moved in a horizontal direction and is arranged directly beneath the gluing unit 44, thereby preventing the film strip pack 34 pushed into the gap 46 from falling out. Every time a film strip pack 34 is pushed in, the lower access to gap 46 is briefly opened by moving the retaining element 40 and is subsequently closed again.

Whilst the film strip packs 34 of film strips 30 stacked in the gap 46 are passing through the gluing unit 44, partial gluing of the adjacent film strips 30 at the site of the adhesive strips 18 occurs.

The endless tape-shaped object 48 formed in the gap 46 exits the gap 46 and is subsequently laid for example in loops on a height-adjustable pallet 52, and after it reaches the desired length, is separated for further transport. The tape-shaped object 48 may however directly be continuously further processed after it exits the gap 46.

Figure 2:
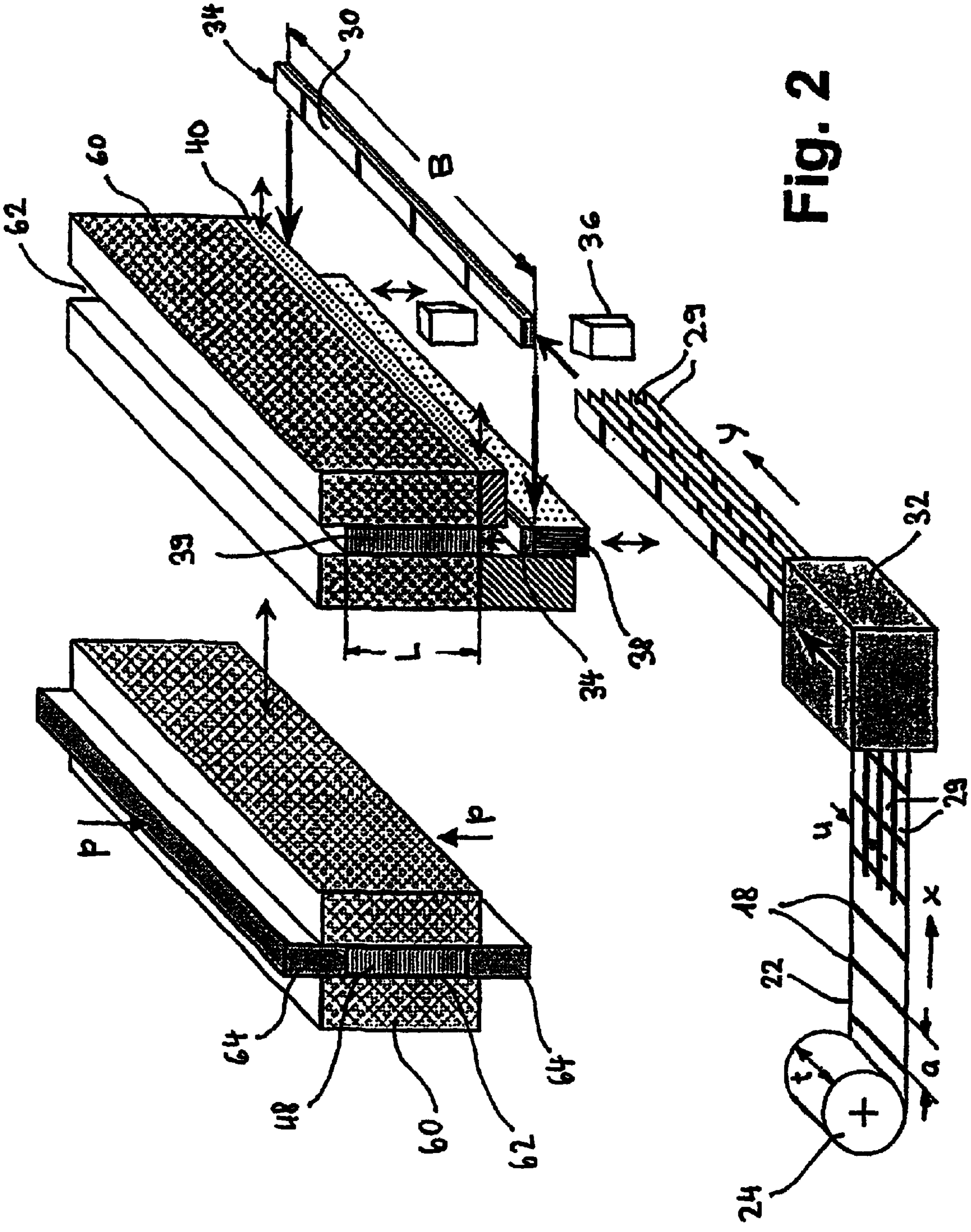
FIG. 2 a view from the side of a different arrangement for the manufacture of a tape-shaped object made of partially glued together film strips.

The arrangement shown in FIG. 2 for the manufacture of a tape-shaped object 48 with prescribed length L and width B is identical to the arrangement of FIG. 1 from the film web roll 24 to the pull-out element 38. For this reason the same parts in this arrangements have been given the same reference numbers.

A stacking module 60 with a gap 62 is arranged in place of the gluing unit 44. Dependent on the desired length L of the tape-shaped object or tape section to be manufactured, a stacking module 60 of corresponding length and width may be used. As soon as the film strip stack 39 in the stacking module 60 has reached the desired length L, the stacking module 60 with the film strip stack 39 is removed from the arrangement and exchanged for an equivalent or different stacking module 60.

Limit elements 64 are introduced on both sides in the gap 62 of the stacking module 60 loaded with the film strip stack 39, and are pressed against the film strip stack 39 in order to set a contact pressure p which is adequate to glue the film strips 30. If necessary the heat required to glue the film strips may subsequently be applied to the stacking module 60 either directly or indirectly, e.g. in a furnace. If necessary the stacking module 60 may also be cooled.

After gluing, the film strip stack 39 is removed from the stacking module 60 as a tape-shaped object 48 of length L and width B.

The arrangement shown in FIG. 2 is especially suitable for the manufacture of small series of tape-shaped objects 46 with frequently changing dimensions and for individual production operations.

A number of materials, for example paper, plastics, metal films such as aluminium foils, or laminates of these materials, may be processed into tape-shaped object 48 made of partially glued together film strips using the process described. The tape-shaped object described may for example be used in its extended state either alone or in a composite with one or two covering layers or sheets, as a lightweight building material in many spheres of application.

What is claimed is:

1. A process for forming a tape-shaped object having a desired length, width and thickness comprising the steps of:

(a) feeding a film web in a feed direction;

(b) applying adhesive strips to at least one surface of the film web in a direction which is transverse to the feed direction, wherein the adhesive strips are spaced apart from each other;

(c) dividing the web in the feed direction into a plurality of film strip webs of substantially equal width;

(d) stacking the plurality of film strip webs one on top of another wherein the adhesive strip on one of the film strip webs is offset from the adhesive strip on an adjacent, stacked film strip web;

(e) cutting the stacked plurality of film strip webs into a desired length to form a film strip pack; and (f) stacking and gluing a plurality of film strip packs together to form the object of desired length, width and thickness, wherein the film strip packs are stacked in a gap of a stacking apparatus and during the gluing means are inserted into the gap on either side of the stacks of film strip packs to apply pressure to the stack in the gap.

2. A process according to claim 1, wherein the adhesive strips on the individual film strips are applied at an equal distance (a) from one another and the adjacent film strips is offset by half of distance (a).

3. A process according to claim 1, wherein the film web is made of one of aluminium and an aluminium alloy.

4. A process according to claim 1, wherein exerting pressure on the stacked film strip packs in the direction of stacking.

5. A process according to claim 1, wherein the film strip webs in the film strip packs are heated and/or cooled during the gluing operation.

6. A process according to claim 1, wherein the dividing of the film web into the film strip webs is carried out by waste-free cutting operations.

7. A process according to claim 1, wherein the film web is pretreated and thereafter provided with the adhesive strips.

8. A device for forming a tape-shaped object having a desired length, width and thickness comprising:

(a) means for feeding a film web in a feed direction;

(b) means for applying adhesive strips to at least one surface of the film web in a direction which is transverse top the feed direction, wherein the adhesive strips are spaced apart from each other;

(c) means for dividing the web in the feed direction into a plurality of film strip webs of substantially equal width;

(d) means for stacking the plurality of film strip webs one on top of another wherein the adhesive strip on one of the film strip webs is offset from the adhesive strip on an adjacent, stacked film strip web;

(e) means for cutting the stacked plurality of film strip webs into a desired length to form a film strip pack; and (f) means for stacking and gluing a plurality of film strip packs together to form the object of desired length, width and thickness, wherein braking elements to inhibit the forward movement of the film strip pack are arranged after the means for stacking and gluing to increase the pressure acting on the film strips in the film strip pack in the direction of stacking.

9. A device according to claim 8, wherein the means for stacking and gluing includes a means for exerting pressure on the film strips in the film strip pack in the direction of stacking, by applying pressure from the sides on the film strip pack.

10. A device for forming a tape-shaped object having a desired length, width and thickness comprising:

(a) means for feeding a film web in a feed direction;

(b) means for applying adhesive strips to at least one surface of the film web in a direction which is transverse top the feed direction, wherein the adhesive strips are spaced apart from each other;

(c) means for dividing the web in the feed direction into a plurality of film strip webs of substantially equal width;

(d) means for stacking the plurality of film strip webs one on top of another wherein the adhesive strip on one of the film strip webs is offset from the adhesive strip on an adjacent, stacked film strip web;

(e) means for cutting the stacked plurality of film strip webs into a desired length to form a film strip pack;

(f) means for stacking and gluing a plurality of film strip packs together to form the object of desired length, width and thickness; and (g) further comprising a first cutting station to divide the film web into the plurality of strip webs of equal width, a turning station to turn and bring on top of one another the individual film strip webs with adhesive strips offset from one another, a second cutting station for cutting the stacked plurality of film strip webs, handling elements for the transport of the film strip packs, a pull-out element on which to lay the individual film strip packs, a stacking module with a gap to take the film strip packs by way of the pull-out element and two limiting elements which may be inserted from both sides into the gap in the stacking module to generate pressure (p) on the film strip pack in the gap.

11. A device according to claim 1, including a gluing unit which is heatable and/or coolable.

12. A device according to claim 1, further comprising a first cutting station to divide the film web into the plurality of strip webs of equal width, a turning station to turn and bring on top of one another the individual film strip webs with adhesive strips offset from one another, a second cutting station for cutting the stacked plurality of film strip webs, handling elements for the transport of the film strip packs, a pull-out element on which to lay the individual film strip packs, a stacking module with a gap to take the film strip packs by way of the pull-out element and two limiting elements which may be inserted from both sides into the gap in the stacking module to generate pressure (p) on the film strip pack in the gap.

13. A device according to claim 12, wherein the first cutting station includes a cutting device for waste-free cutting.

14. A device according to claim 12, wherein the turning station includes rollers arranged at an angle of 45° to the film web.

15. A device according to claim 12, wherein the second cutting station includes a blade.

* * * * *